United States Patent
Bai et al.

(10) Patent No.: US 10,977,133 B2
(45) Date of Patent: Apr. 13, 2021

(54) MULTIMEDIA FILE REPAIR METHODS AND APPARATUS

(71) Applicant: SZ DJI TECHNOLOGY CO., LTD, Shenzhen (CN)

(72) Inventors: Gao Ping Bai, Shenzhen (CN); Tai Wen Liang, Shenzhen (CN); Yuan Hua Zheng, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 788 days.

(21) Appl. No.: 15/600,654

(22) Filed: May 19, 2017

(65) Prior Publication Data

US 2017/0262342 A1 Sep. 14, 2017

Related U.S. Application Data

(63) Continuation of application No. 14/323,901, filed on Jul. 3, 2014, now Pat. No. 9,665,444, which is a
(Continued)

(51) Int. Cl.
G06F 11/14 (2006.01)

(52) U.S. Cl.
CPC ...... *G06F 11/1458* (2013.01); *G06F 11/1435* (2013.01); *G06F 11/1446* (2013.01)

(58) Field of Classification Search
CPC ............ G06F 11/1458; G06F 11/1435; G06F 11/1446
See application file for complete search history.

(56) References Cited

U.S. PATENT DOCUMENTS

| 7,689,619 | B2 | 3/2010 | Kisliakov |
| 8,514,887 | B2 | 8/2013 | MacDonald et al. |

(Continued)

FOREIGN PATENT DOCUMENTS

| CN | 101656618 A | 2/2010 |
| JP | 2004007533 A | 1/2004 |

(Continued)

OTHER PUBLICATIONS

International search report and written opinion dated Mar. 27, 2015 for PCT/CN2014/080745.
(Continued)

*Primary Examiner* — Matthew J Ellis
(74) *Attorney, Agent, or Firm* — Anova Law Group, PLLC

(57) ABSTRACT

Improved methods, systems and apparatus for storing and repairing multimedia files are provided that overcome the limitations of existing multimedia file repair technologies. Backup copies of the multimedia container information associated with given multimedia content data are stored, along with the multimedia content data, on an external storage detachably coupled to a recording device. A primary copy of the multimedia container information is stored on an internal storage associated with the recording device. The recording of the primary container information and the content data is performed in real-time or nearly real-time as the content data is captured by the recording device. In the case of an abnormal event (e.g., battery failure, disconnect of storage media), container information may be selected from the primary copy or the backup copies of the container information, thereby increasing the likelihood that the container file can be successfully repaired or regenerated.

20 Claims, 11 Drawing Sheets

Related U.S. Application Data continuation of application No. PCT/CN2014/080745, filed on Jun. 25, 2014.

(56) References Cited

U.S. PATENT DOCUMENTS

| | | | |
|---|---|---|---|
| 9,665,444 B2 | 5/2017 | Bai et al. | |
| 10,162,693 B1* | 12/2018 | Contino | G06F 11/0748 |
| 2003/0066932 A1 | 4/2003 | Carroll | |
| 2003/0188182 A1 | 10/2003 | Sato et al. | |
| 2007/0174580 A1 | 7/2007 | Shulga | |
| 2007/0220029 A1 | 9/2007 | Jones et al. | |
| 2008/0119979 A1* | 5/2008 | Impson | H04L 67/12 |
| | | | 707/640 |
| 2009/0089535 A1* | 4/2009 | Lohmar | H04N 21/2381 |
| | | | 711/173 |
| 2009/0177942 A1 | 7/2009 | Hannuksela et al. | |
| 2009/0228650 A1 | 9/2009 | Rossario | |
| 2010/0138605 A1* | 6/2010 | Kazar | G06F 3/0611 |
| | | | 711/114 |
| 2011/0252069 A1 | 10/2011 | Brodie et al. | |
| 2012/0011270 A1 | 1/2012 | Priddle et al. | |
| 2012/0036221 A1 | 2/2012 | Numakami | |
| 2012/0233417 A1* | 9/2012 | Kalach | G06F 11/1453 |
| | | | 711/162 |
| 2012/0237026 A1 | 9/2012 | Sato et al. | |
| 2013/0097458 A1* | 4/2013 | Sekino | G06F 11/1441 |
| | | | 714/6.3 |
| 2013/0302006 A1 | 11/2013 | Previti et al. | |

FOREIGN PATENT DOCUMENTS

| | | |
|---|---|---|
| JP | 2005531866 A | 10/2005 |
| JP | 2006221628 A | 8/2006 |
| JP | 2008271414 A | 11/2008 |
| JP | 2016505935 A | 2/2016 |
| WO | WO-2014075609 A1 | 5/2014 |
| WO | WO-2014084666 A1 | 6/2014 |

OTHER PUBLICATIONS

Notice of allowance dated Mar. 21, 2017 for U.S. Appl. No. 14/323,901.
Office action dated May 1, 2015 for U.S. Appl. No. 14/323,901.
Office action dated May 20, 2016 for U.S. Appl. No. 14/323,901.
Office action dated Oct. 1, 2015 for U.S. Appl. No. 14/323,901.
Office action dated Oct. 17, 2014 for U.S. Appl. No. 14/323,901.
Office action dated Nov. 10, 2016 for U.S. Appl. No. 14/323,901.

* cited by examiner

MULTIMEDIA FILE REPAIR METHODS AND APPARATUS

CROSS-REFERENCE

This application is a continuation of U.S. patent application Ser. No. 14/323,901, filed on Jul. 3, 2014, which is a continuation of International Application No. PCT/CN2014/080745, filed on Jun. 25, 2014, the content of which is hereby incorporated by reference in its entirety.

BACKGROUND OF THE INVENTION

Multimedia content such as video or audio data is typically packaged in a multimedia container file to facilitate streaming and/or playback of the multimedia content by various programs. The structure and content of the multimedia container file is typically dictated by a particular multimedia container format. The multimedia container file can be used to identify and interleave different data types such as audio, video streams, subtitles, synchronization information needed to play back the multimedia content, and the like. Most digital media recording devices or systems such as cameras or camcorders typically record both multimedia content data (e.g., raw or encoded video and/or audio streams) and the corresponding multimedia container information (e.g., information describing the content data, codec parameters) as part of the recording process. The multimedia content data and the multimedia container information are typically stored at different storage locations to avoid overwrite of each other as the multimedia content data and the multimedia container information grow dynamically during the recording. For example, the multimedia container information is stored in an internal flash memory of the recording device while the multimedia content data is stored on an external storage medium such as a Secure Digital (SD) card, USB drive, hard drive disk, and the like. When the recording stops, the multimedia container information and the multimedia content data is combined or otherwise used to generate the multimedia container file suitable for streaming or playback.

When the recording stops due to abnormal events, the multimedia container file may not be generated or maybe generated improperly because the multimedia content data and the multimedia container information required for the generation of the multimedia container file, located at different locations, have not yet been properly integrated into the final multimedia container file. Such abnormal events that cause the disruption of recordings may include software or hardware failure such as a system crash, battery failure, unexpected disconnection of a storage medium, recording device, or any other critical component, and the like.

To remedy the problem of abnormal disruption of recordings, some recording devices provide mechanisms for repairing or restoring the multimedia container files that should have been generated had the recording stopped normally. Such mechanisms typically involve the generation of multimedia container files based on the existence of previously-stored multimedia content data and the multimedia container information. Existing multimedia file repair solutions have numerous limitations. For example, existing technologies cannot be used to repair multimedia files if the multimedia container information is inaccessible or unavailable. The multimedia container information may be inaccessible due to malfunction or corruption of the internal storage of the recording device, for example. Additionally, the multimedia container information may be overwritten or erased before it is used to construct the multimedia container file. For example, a new SD card may be inserted into the recording device in place of an old SD card that was used to record the content data before the abnormal event. In this case, the new SD card would not have the multimedia content data previously stored in the old SD card and therefore cannot be used to restore the multimedia container file with the container information left in the internal storage of the recording device. Furthermore, the container information that is left in the internal storage of the recording device may become erased or overwritten with the recording of new media content, making it impossible to later restore the old multimedia container file.

One approach to solve this problem involves preserving the old multimedia container information in the internal storage of the recording device indefinitely until the corresponding multimedia content data is available again for the generation of the multimedia container file (e.g., when the old SD card containing the old multimedia content data is connected again to the recording device). The drawback is that a potentially large amount of storage space may be taken up for an indefinite period of time in the internal storage of the recording device, which typically has a relatively small storage capacity to start with. Accordingly, there is a need for improved methods and apparatus for repair and restoration of multimedia files without significant space overhead.

SUMMARY OF THE INVENTION

Improved methods, systems and apparatus for storing and repairing multimedia files are provided that overcome the limitations of existing multimedia file repair technologies discussed above.

According to an aspect of the present invention, a method for managing multimedia information is provided. The method comprises storing multimedia content data on a first storage medium; storing a primary copy of multimedia container information associated with the multimedia content data on a second storage medium, the multimedia container information useful for generating a multimedia container file containing the multimedia content data according to a multimedia container format; storing one or more backup copies of multimedia container information associated with the multimedia content data on the first storage medium; and generating the multimedia container file based at least in part on the multimedia content data and a preferred copy of multimedia container information selected from a group comprising the primary copy of multimedia container information and the one or more backup copies of multimedia container information.

According to another aspect of the present invention, a system for managing multimedia information is provided. The system comprises one or more processors; and memory, including instructions executable by the one or more processors to cause the system to at least: store multimedia content data on a first storage medium; store a primary copy of multimedia container information associated with the multimedia content data on a second storage medium, the multimedia container information useful for generating a multimedia container file containing the multimedia content data according to a multimedia container format; store one or more backup copies of multimedia container information associated with the multimedia content data on the first storage medium; and generating the multimedia container file based at least in part on the multimedia content data and a preferred copy of multimedia container information selected from a group comprising the primary copy of multimedia container information and the one or more backup copies of multimedia container information.

According to another aspect of the present invention, an apparatus for recording multimedia information is provided. The apparatus comprises one or more processors; and memory, including instructions executable by the one or more processors to cause the apparatus to at least: store multimedia content data on a first storage medium; store a primary copy of multimedia container information associated with the multimedia content data on a second storage medium, the multimedia container information useful for generating a multimedia container file containing the multimedia content data according to a multimedia container format; store one or more backup copies of multimedia container information associated with the multimedia content data on the first storage medium; and generating the multimedia container file based at least in part on the multimedia content data and a preferred copy of multimedia container information selected from a group comprising the primary copy of multimedia container information and the one or more backup copies of multimedia container information.

According to another aspect of the present invention, one or more non-transitory computer-readable storage media are provided, the storage media having stored thereon executable instructions that, when executed by one or more processors of a computer system, cause the computer system to at least: store multimedia content data on a first storage medium; store a primary copy of multimedia container information associated with the multimedia content data on a second storage medium, the multimedia container information useful for generating a multimedia container file containing the multimedia content data according to a multimedia container format; store one or more backup copies of multimedia container information associated with the multimedia content data on the first storage medium; and generating the multimedia container file based at least in part on the multimedia content data and a preferred copy of multimedia container information selected from a group comprising the primary copy of multimedia container information and the one or more backup copies of multimedia container information.

According to another aspect of the present invention, a method for generating a multimedia file is provided. The method comprises detecting a first storage medium with multimedia content data stored thereon; in response to the detection of the first storage medium, selecting a copy of multimedia container information to be used for generating a multimedia container file containing the multimedia content data according to a multimedia container format from a group comprising a primary copy of multimedia container information stored on a second storage medium and a plurality of backup copies of multimedia container information stored on the first storage medium; and generating the multimedia container file according to the multimedia container format based on the multimedia content data and the selected copy of multimedia container information.

According to another aspect of the present invention, a system for generating a multimedia file is provided. The system comprises one or more processors; and memory, including instructions executable by the one or more processors to cause the system to at least: detect a first storage medium with multimedia content data stored thereon; in response to the detection of the first storage medium, select a copy of multimedia container information to be used for generating a multimedia container file containing the multimedia content data according to a multimedia container format from a group comprising a primary copy of multimedia container information stored on a second storage medium and a plurality of backup copies of multimedia container information stored on the first storage medium; and generate the multimedia container file according to the multimedia container format based on the multimedia content data and the selected copy of multimedia container information.

According to another aspect of the present invention, an apparatus for generating a multimedia file is provided. The apparatus comprises one or more processors; and memory, including instructions executable by the one or more processors to cause the apparatus to at least: detect a first storage medium with multimedia content data stored thereon; in response to the detection of the first storage medium, select a copy of multimedia container information to be used for generating a multimedia container file containing the multimedia content data according to a multimedia container format from a group comprising a primary copy of multimedia container information stored on a second storage medium and a plurality of backup copies of multimedia container information stored on the first storage medium; and generate the multimedia container file according to the multimedia container format based on the multimedia content data and the selected copy of multimedia container information.

According to another aspect of the present invention, one or more non-transitory computer-readable storage media are provided, the storage media having stored thereon executable instructions that, when executed by one or more processors of a computer system, cause the computer system to at least: detect a first storage medium with multimedia content data stored thereon; in response to the detection of the first storage medium, select a copy of multimedia container information to be used for generating a multimedia container file containing the multimedia content data according to a multimedia container format from a group comprising a primary copy of multimedia container information stored on a second storage medium and a plurality of backup copies of multimedia container information stored on the first storage medium; and generate the multimedia container file according to the multimedia container format based on the multimedia content data and the selected copy of multimedia container information.

According to another aspect of the present invention, a method for recording multimedia content is provided. The method comprises recording, in real-time or nearly real-time, multimedia content data on a first storage medium as the multimedia content data is captured by a recording device; recording, in real-time or nearly real-time, a primary copy of multimedia container information associated with the multimedia content data on a second different storage medium, the multimedia container information useful for generating a multimedia container file containing the multimedia content data according to a multimedia container format; and updating one or more backup copies of the multimedia container information substantially concurrently with the recording of the multimedia container information, the one or more backup copies of the multimedia container information being stored on one or more backup storage media that are different than the second storage medium.

According to another aspect of the present invention, a system for generating a multimedia file is provided. The system comprises one or more processors; and memory, including instructions executable by the one or more processors to cause the system to at least: record, in real-time or nearly real-time, multimedia content data on a first storage medium as the multimedia content data is captured by a recording device; record, in real-time or nearly real-time, a primary copy of multimedia container information associated with the multimedia content data on a second different storage medium, the multimedia container information useful for generating a multimedia container file containing the multimedia content data according to a multimedia container format; and update one or more backup copies of the multimedia container information substantially concurrently with the recording of the multimedia container information, the one or more backup copies of the multimedia container information being stored on one or more backup storage media that are different than the second storage medium.

According to another aspect of the present invention, an apparatus for generating a multimedia file is provided. The apparatus comprises one or more processors; and memory, including instructions executable by the one or more processors to cause the apparatus to at least: record, in real-time or nearly real-time, multimedia content data on a first storage medium as the multimedia content data is captured by the apparatus; record, in real-time or nearly real-time, a primary copy of multimedia container information associated with the multimedia content data on a second different storage medium, the multimedia container information useful for generating a multimedia container file containing the multimedia content data according to a multimedia container format; and update one or more backup copies of the multimedia container information substantially concurrently with the recording of the multimedia container information, the one or more backup copies of the multimedia container information being stored on one or more backup storage media that are different than the second storage medium.

According to another aspect of the present invention, one or more non-transitory computer-readable storage media are provided, the storage media having stored thereon executable instructions that, when executed by one or more processors of a computer system, cause the computer system to at least: record, in real-time or nearly real-time, multimedia content data on a first storage medium as the multimedia content data is captured by a recording device; record, in real-time or nearly real-time, a primary copy of multimedia container information associated with the multimedia content data on a second different storage medium, the multimedia container information useful for generating a multimedia container file containing the multimedia content data according to a multimedia container format; and update one or more backup copies of the multimedia container information substantially concurrently with the recording of the multimedia container information, the one or more backup copies of the multimedia container information being stored on one or more backup storage media that are different than the second storage medium.

According to another aspect of the present invention, a recording device is provided that implements the methods described herein. The apparatuses described herein may include a recording device.

According to another aspects of the present invention, an unmanned aerial vehicle (UAV) is provided. The UAV can be configured to be coupled with and/or carry systems, apparatuses, or recording devices described herein. The UAV can also be configured to implement the systems and methods described herein.

In some embodiments, the first storage medium can be detachably coupled with a recording device. The first storage medium can include, for example, a secure digital (SD) card or a USB drive. The recording device can be configured to record audio or video signals. The second storage medium can be internally coupled with the recording device. The second storage medium can include a flash memory.

In some embodiments, the first storage medium or the second storage medium includes a remote storage medium.

In some embodiments, the multimedia container information can include descriptive information of the multimedia content data. The multimedia container information can include coding information for the multimedia content data. The coding information can be related to compression or encryption of the multimedia content data. The multimedia container information can also include storage location information of the multimedia content data.

In some embodiments, the multimedia content data includes audio or video data.

In some embodiments, one or more backup copies of multimedia container information are updated. At least one of the one or more backup copies of multimedia container information can be updated on a periodic basis. In some embodiments, at least two of the one or more backup copies of multimedia container information are updated in an alternating fashion.

In some embodiments, a preferred copy of multimedia container information to be used for generating the multimedia container file can be selected based at least in part on a validity indicator associated with the primary copy of multimedia container information.

In some embodiments, selecting the preferred copy of multimedia container information can comprise determining, based on the validity indicator associated with the primary copy of multimedia container information, whether the primary copy of the multimedia container information can be used for generating the multimedia container file.

In some embodiments, selecting the preferred copy of multimedia container information can further comprise selecting the primary copy of multimedia container information as the preferred copy of the multimedia container information if the validity indicator indicates that the primary copy of the multimedia container information can be used for generating the multimedia container file; and selecting one of the one or more backup copies of multimedia container information as the preferred copy of the multimedia container information if the validity indicator indicates that the primary copy of the multimedia container information cannot be used for generating the multimedia container file.

In some embodiments, selecting one of the one or more backup copies of multimedia container information can be based at least in part on an update indicator respectively associated with each of the one or more backup copies of multimedia container information.

In some embodiments, selecting the copy of multimedia container information can include determining whether the primary copy of multimedia container information or any of the plurality of backup copies of multimedia container information corresponds to the multimedia content data stored on the first storage medium. In some embodiments, one of the plurality of backup copies of multimedia container information can be selected if it is determined that the primary copy of the multimedia container information does not correspond to the multimedia content data.

In some embodiments, generating the multimedia container file comprises combining information from the selected copy of multimedia container information with the multimedia content data. In some embodiments, generating the multimedia container file further comprises generating descriptive information based on the multimedia container information.

In some embodiments, at least one of the one or more backup copies of multimedia container information is removed, deleted, marked for deletion, or otherwise rendered obsolete after the generation of the multimedia container file. In some embodiments, the primary copy of multimedia container information and/or the content data can be removed, deleted, marked for deletion, or otherwise rendered obsolete after the generation of the multimedia container file.

It shall be understood that different aspects of the invention can be appreciated individually, collectively, or in combination with each other. Various aspects of the invention described herein may be applied to any of the particular applications set forth below or storage and generation any other types of data objects. Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Improved methods, systems and apparatus for storing and repairing multimedia files are provided that overcome the limitations of existing multimedia file repair technologies discussed above. According to aspects of the invention, backup copies of the multimedia container information associated with given multimedia content data are stored, along with the multimedia content data, on an external storage detachably coupled to a recording device. A primary copy of the multimedia container information is stored on an internal storage associated with the recording device. The recording of the primary container information and the content data is performed in real-time or nearly real-time as the content data is captured by the recording device. In the case of an abnormal event (e.g., battery failure, disconnect of storage media), container information may be selected from the primary copy or the backup copies of the container information, thereby increasing the likelihood that the container file can be successfully repaired or regenerated.

Figure 1:
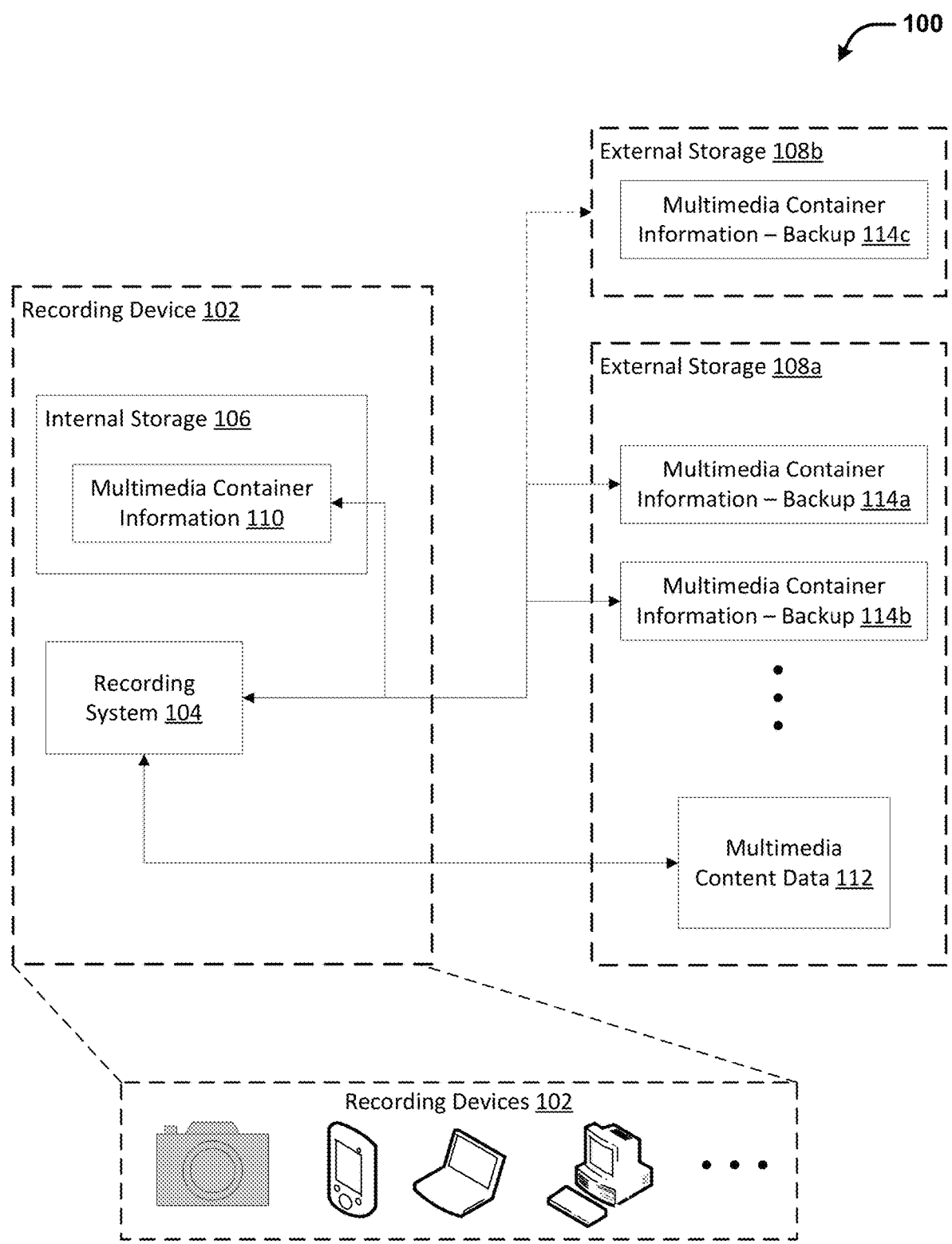
FIG. 1 illustrates a multimedia management system, in accordance with an embodiment of the present invention.

FIG. 1 illustrates a multimedia management system 100, in accordance with an embodiment of the present invention. In various embodiments, the system 100 can be used to capture, store, and/or repair multimedia data such as video, audio, still images, and the like, using the techniques described herein. The components shown in this and other figures in this disclosure are for illustrative purposes only and not intended to be limiting. In various embodiments, there can be more or less components than illustrated herein.

The system 100 can be implemented at least in part by a recording device 102. The recording device 102 can include any device capable of recording and/or processing audio, video, still images, or other signals as analog or digital data. Examples of recording devices can include cameras (e.g., digital cameras), camcorders, video cameras, digital media players (PMPs), camera phones, smart phones, personal digital assistants (PDAs), tablet computing devices, laptop computers, desktop computers, smart TVs, game consoles, and the like.

The recording device 102 can include a recording system 104 capable of capturing and processing audio, video or other signals. For instance, the recording system 104 can include sensors for capturing images, sound, or other types of information. The sensors may include image sensors (e.g., photo sensors), lenses or other optical components, microphones, and the like. The recording system 104 can also be configured to cause storage of data representing audio, video, images, text, or other analog or digital signals on various data storage devices and/or generate media files (e.g., multimedia container files) for playback or streaming based on the recorded data. The generation of media files can be performed under normal circumstances, for example, upon the completion of an audio or video recording, or after abnormal events such as a software crash or hardware failure (e.g., involving battery, data storage medium, or other hardware components), disconnect of data storage media or other critical components of the system, and the like. After abnormal events, multimedia container files may need to be regenerated or otherwise repaired.

In various embodiments, the file repair process can occur automatically or in response to a user action. For example, the repair process can occur automatically in response to certain detected events or conditions indicating that the system has resumed normal operation. Such events or conditions may include system power up, connection of a new storage medium (e.g., when an SD card is inserted into the recording device), or other similar events or conditions. As another example, the repair process can occur in response to user actions such as a selection of a menu item using a user interface or input device of the recording device (e.g., via joystick, keyboard, mouse, touchscreen, voice command, gestures, rotational or translational movement of a controller, etc.).

Besides storage and repair of media files, the multimedia management system 100 may also include modules or components to perform analog-to-digital conversion of audio, video or other signals, compression or decompression of the signals using one or more coding algorithms, encryption and/or decryption of recorded data, playback, transmission and/or streaming of recorded data, and the other functionalities.

The multimedia management system 100 also includes a plurality of data storage devices for storing data that is captured, processed, generated or otherwise used by the multimedia management system. In various embodiments, the data storage devices may be based on semiconductor, magnetic, optical or any suitable technologies and may include flash memory, USB drives, memory cards, solid-state drives (SSDs), hard disk drives (HDDs), floppy disks, optical disks, magnetic tapes, and the like. In some embodiments, the storage devices can include one or more internal storage media 106 and one or more external storage media 108a-c.

The internal storage media 106 may include one or more data storage devices that are typically an integral part of and not normally detached from the recording device 102. For example, the internal storage may be located within a body or housing of the recording device and not easily removable. Examples of such internal storage media include internal flash memory such as NAND-type flash memory and other suitable types of memory components. In some cases, the internal storage media can be accessed directly, via internal bus, by a processing unit of the recording device.

The external storage media 108a-b can include removable storage devices that are detachably couplable to the recording device. For example, the removable storage devices may be operatively connected to the recording device via a wired or hardware-based connection, capable of being inserted into and ejected from the recording device, or attachable to the outside of the body of the recording device. Such removable storage devices may include memory cards of any suitable formats such as PC Card, CompactFlash, SmartMedia, Memory Stick, Memory Stick Duo, Memory Stick PRO Duo, Miniature Card, Multimedia Card (MMC), Reduced Size Multimedia Card (RS-MMC), MMCmicro Card (MMCmicro), PS2 card, Secure Digital (SD) card, SxS, Universal Flash Storage (UFS), miniSD, microSD, xD-Picture Card, Intelligent Stick (iStick), Serial Flash Module (SFM), NT Card, XQD card, and the like. The external storage media can also include external hard disk drives, optical drives, tape drives, floppy drives, and other suitable storage devices that may be operatively connected to the recording device. In some cases, the external storage media can also include networked storage media such as data storage servers (e.g., cloud storage) that can communicate with the recording device via a wired or wireless network connection without requiring physical connection to the recording device.

The internal and external storage devices may be configured to store different types of data. Compared with internal storage devices, external storage devices typically have larger storage capacity. In some cases, the internal storage has higher performance (e.g., faster read/write time). As such, in an embodiment, the external storage 108a is typically used to store the larger multimedia content data 112 (which may also be referred to as content data) such as data streams of digital audio, video, still images, text, or other payload data. The internal storage 106 is typically used to store the smaller multimedia container information 110 (which may also be referred to as container information) associated with the multimedia content data 112 that is useful for generating a multimedia container file according to a specific multimedia container format (which may also be referred to as container format). Both the content data and container information are typically stored and updated incrementally in real-time or nearly real-time with the recording of the content data stream.

According to an aspect of the present invention, redundancy is provided to container information, which is essential for the generation of container files. Such redundancy is provided by storing additional backup copies of the container information 114a-c in the external storage devices 108a-b in addition to the primary copy of container information 110 that is stored in the internal storage 106. In some embodiments, the backup copies of container information 114a-b can be stored in the same storage medium 108a as the content data 112. Additionally or alternatively, the backup copies of container information 114c can be stored in a storage medium 108b that is different than that for the content data 112. The number of backup copies of container information and the number of storage devices shown in FIG. 1 are for illustrative purposes only and not intended to be limiting. For example, each of the external storage devices 108a-b can include one, two, three, four or more copies of container information. As another example, the backup copies of container information may be stored on one, two, three, four, or more external storage devices. Similarly, one, two, three, four, or more external devises may be utilized.

The backup container information can be updated substantially concurrently as the storage of the content data and/or container information. For instance, the backup container information may be updated in real-time or within 2 seconds, 1 second, 0.5 second, 0.1 second, or 0.01 second of the storage of content data and/or container information. In some embodiments, the backup container information is updated on a periodic basis to reflect the latest container information (e.g., every one, two, or four seconds). One or more backup copies may be updated based on a predetermined schedule or a set of predetermined criteria. For example, when multiple backup copies are provided, the copies may be updated in an alternate or round-robin fashion where each copy gets updated at the substantially the same frequency. As another example, the copies may be updated with different frequencies or priorities. For example, backup copies of container information 114a-b stored in the same storage medium as the content data 112 may be updated at a higher frequency than the back container information 114c stored in a different external storage device 108b. Such different update frequencies or priorities may be based on location, performance parameters (e.g., read/write speed), capacity, load, availability, security, or other characteristics associated with the storage devices, user preferences, or other relevant factors. In some cases, the update frequency or criteria may be specified by a user of the system. Detailed discussion on the methods for storage and update of container information is provided in the discussion of FIGS. 5-7.

During the repair process, the content file can be generated based on the multimedia content data 112 and a preferred copy of container information selected from the primary container information 110 and backup copies of container information 114a-c. Detailed discussion on the methods for repairing container is provided in the discussion of FIGS. 8-9.

Multimedia container files (container files) are computer-readable data files that are used to identify and interleave one or more data types such as one or more audio or video streams, subtitles, chapter-information, metadata, synchronization information that is needed to play back the various streams together, and any other suitable information. The structure, organization, and/or content of the container files are typically specified by the suitable container formats. For example, some container formats (e.g., Audio Video Interleave (AVI), MP4, Mastroska) divide a file's data into blocks, chunks, or segments, where each chunk includes a tag and a corresponding sub-chunk of data. The sub-chunk of data can include the actual audio/visual content data (e.g., part of a movie), or metadata describing the content data. The metadata can include length, width, height, and frame rate of a video, file type of the content data, index or codec information associated with the content data or components (e.g., tracks, chapters) thereof.

Container information generally refers to any information associated with the corresponding content data that is used to generate a container file according to a particular container format. The container information may include metadata describing the container file, content data, other metadata, or any suitable information such as user-defined extension data. Examples of such container data can include size, length, height, width, frame rate, file location information (e.g., start position, end position, and/or offset), encoding information (e.g., codec information or error correction code information), encryption information, and other information of the content data or components thereof. Components of the content data can include tracks, frames, chapters, and the like. Metadata stored in the container file can be related to the content data as a whole or individual components thereof. In various embodiments, the container information may be used to directly or indirectly populate the metadata within the container file. For example, some container information may be directly copied into the corresponding container file, while other container information may be used to generate further information that is then copied into the container file. In some cases, the content data may be copied into the container file as metadata. In other cases, the content data may be modified, encoded, divided, encrypted or otherwise processed according to the container format or in a user-defined fashion, before being put into the container file.

Exemplary container formats configured to hold multiple media types such as audio and video include 3GP, Advanced Systems Format (ASF), AVI, DVR-MS, Flash Video, Interchange File Format (IFF), Matroska (MKV), MJ2—Motion JPEG 2000, QuickTime File Format, MPEG program stream, MPEG-2 transport stream (MPEG-TS), MP4, Ogg, RealMedia, DivX Media Format, and the like. Some container formats may be exclusive to hold one media data type such as audio (e.g., Audio Interchange File Format (AIFF), Resource Interchange File Format (RIFF), Waveform Audio File Format (WAV), Extensible Music Format, and the like), or still images (e.g., Flexible Image Transport System (FITS), Tagged Image File Format (TIFF), and the like). Other container formats can be used to hold multiple types of media data.

Various coding schemes can be used to encode (e.g., compress) audio, video, or other content data before the content data is stored in a container file. Exemplary audio coding schemes include Audio Coding (AAC), AC-3, Apple Lossless Audio Codec (ALAC), MPEG-4 Audio Lossless Coding (MPEG-4 ALS), Multi-Band Excitation (MBE), Adaptive Multi-Rate (AMR) audio codec, Adaptive Multi-Rate Wideband (AMR-WB), Adaptive Transform Acoustic Coding (ATRAC), BoradVoice, Constrained Energy Lapped Transform (CELT), Codec2, Enhanced AC-3, Free Lossless Audio Codec (FLAC), G.711, G.719, G.722, G.722.1, G.722.2, G.723.1, G.726, G.728, G.729, GSM-FR, internet Low Bitrate Codec (iLBC), internet Speed Audio Codec (iSAC), Monkey's Audio, MP3, MP2, Musepack, Asao, Opus, RealPlayer, Shorten, SILK, Siren 7, Speex, SVOPC, Ogg, WavPack, Windows Media Audio (WMA), and the like. Examples of video compression formats include MPEG-2 Part 2, MPEG-4 Part 2, H.264 (MPEG-4 Part 10), H.263, H.262, MPEG-4 Part 2, HEVC, Portable Network Graphics (PNG), QuickTime Animation, Theora, Dirac, DV, GoPro CineForm, Motion JPEG, RealVideo, RV40, VP8, VP9, and the like.

In various embodiments, multimedia content data and the corresponding multimedia container information can be combined in different ways to generate a multimedia container file according to the specification of the multimedia container format for the multimedia container file. The container information and content data can be located in different portions of the container file. For example, container information can be stored in the header, before the content data, or at the end of the container file, following the content data. In some cases, the container information and/or content data may be divided into smaller portions that are interleaved in the container file. For example, the content data may include a video comprising may frames. The container information may include metadata related to a whole video such as the length of the video, frame rate, codec information, and the like. Such video-specific metadata may be stored in the header portion of the container file. The container information may also include metadata related to each frame of the video and such frame-specific metadata may be stored as the header for each of the individual frame.

Figure 2:
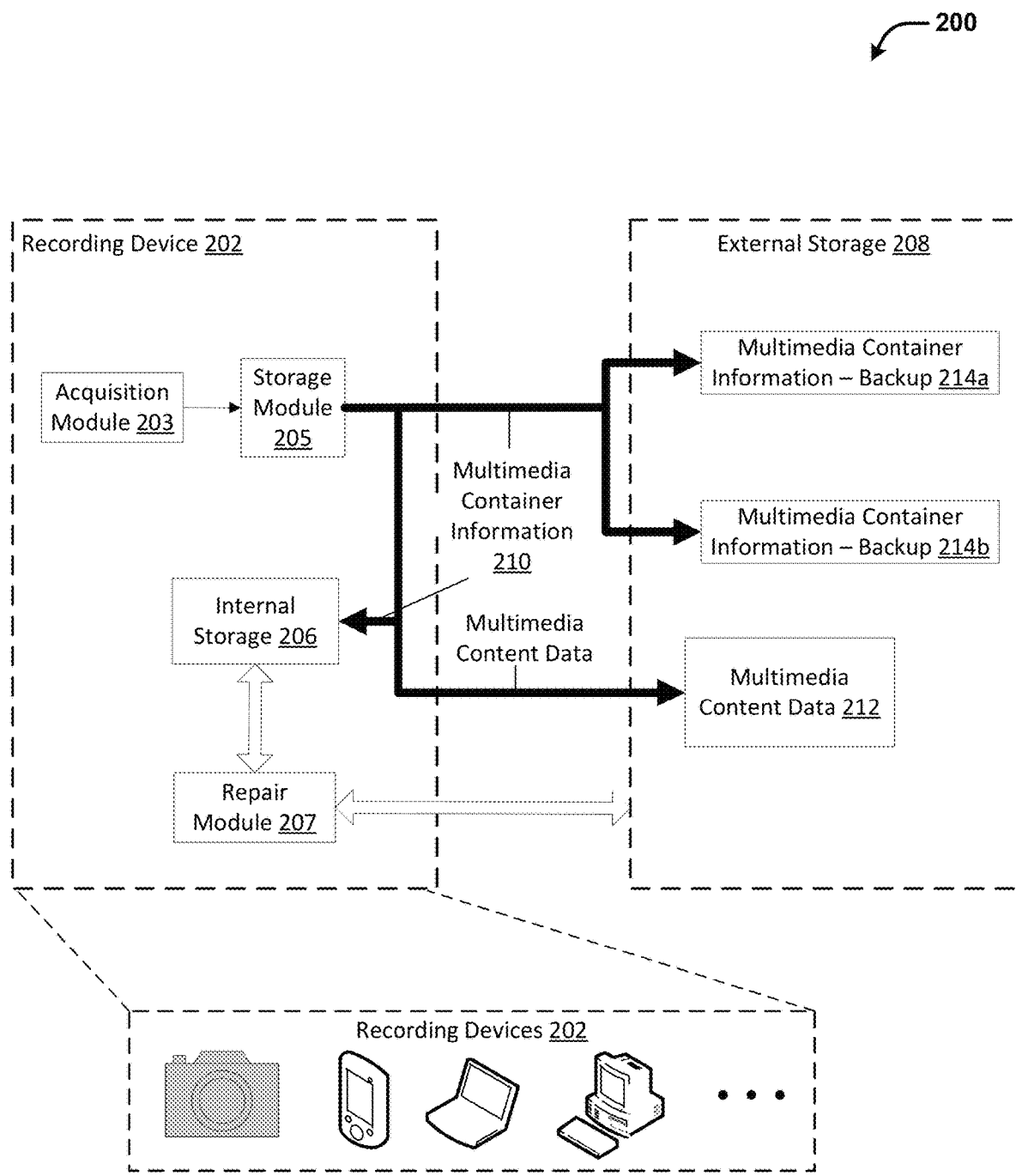
FIG. 2 illustrates another example of a multimedia management system, in accordance with an embodiment.

FIG. 2 illustrates another example of a multimedia management system 200, in accordance with an embodiment of the present invention. The system 200 is similar to the system 100 discussed in connection with FIG. 1, but with more details showing exemplary components or modules that collectively implement one or more functionalities or features of the recording system 104.

The system 200 includes an acquisition module 203 for acquiring or collecting media data such as video, audio, still images, and the like. In some embodiments, the acquisition module can include or be operatively coupled to one or more sensors for capturing images, sound, or other signals. The sensors can include image sensors that converts optical images to electrical signals and/or sound capturing sensors such as microphones. The sensors may also include inertial sensors, position sensors (e.g., GPS and magnetometer), range sensors (e.g., ultrasound, infrared, and LIDAR), or any other suitable sensors for determining a state associated with the system 200. The sensor data provided by these non-visual-audio sensors may be incorporated into the container file or used to generate data that is incorporated into the container file. For example, position information may become part of the caption for a video file.

In some cases, the acquisition module 203 can be configured to process the captured content data such as by compressing and/or encoding the content data. Furthermore, the acquisition module 203 may be configured to generate container information associated with the captured content data. The container information may include various information describing the content data such as size, length, height/width of a video file, frame rate, encoding parameters, timestamp; sensor data obtained from various sensors such as position, attitude, or movement information of the recording device 202; and any other relevant information usable for generating the container file. In various embodiments, the container information may be provided by one or more components (e.g., acquisition module 203, storage module 205) of the system 200, entities external to the system (e.g., a user or remote control device, not shown), or any other suitable sources.

Figure 5:
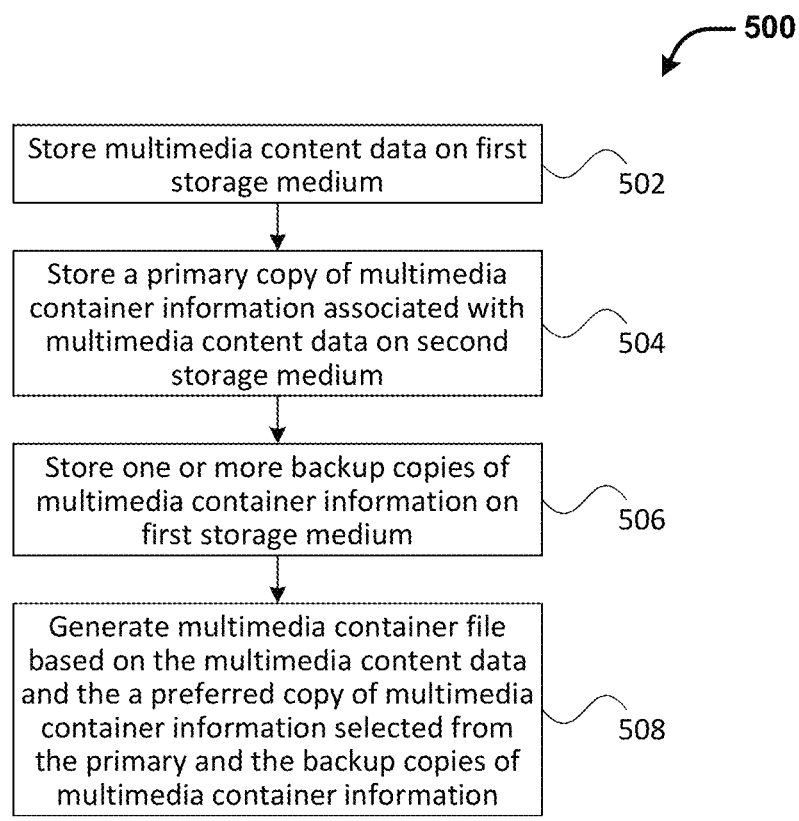
FIG. 5 illustrates an exemplary process for implementing multimedia management, in accordance with an embodiment.
Figure 6:
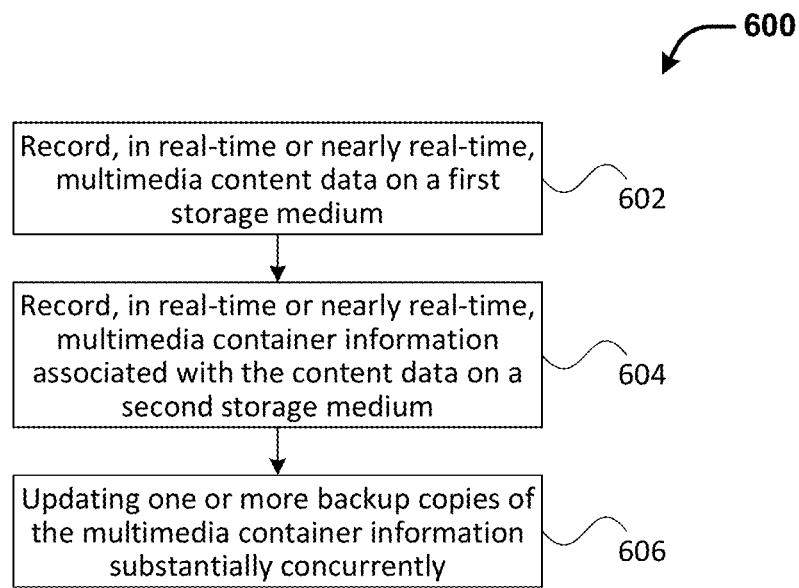
FIG. 6 illustrates an exemplary process for implementing multimedia storage, in accordance with an embodiment.

The system 200 also includes a storage module 205 operably coupled to the acquisition module 203 and configured to cause storage of the content data 212 and the corresponding container information 210. The bolded arrows in FIG. 2 illustrates the data transfer between the storage module 205 and the various storage devices. In particular, in an embodiment, the content data 212 is stored on one or more external (e.g., removable) storage devices 208 and the corresponding container information 210 is stored on one or more internal storage devices 206. Additionally, storage module 205 can cause container information to be backed up and periodically updated in the one or more external storage devices 208 where the content data 212 is stored. As discussed above in connection with FIG. 1, storing backup container information in external devices provides redundancy for the container information, thereby increasing the likelihood of a successful repair of container files after an abnormal event. In some embodiments, the storage module 205 may also be configured to implement some of the functionalities described above in connection with the acquisition module 203 such as compression and generation of container information. FIGS. 5-6 provide more detailed discussion of exemplary methods that may be implemented by the storage module.

Still referring to FIG. 2, the system 200 can also include a repair module 207 configured to generate container files based on content data and the corresponding container information. Normally, when a recording stops, a container file is generated based on the recorded content data and the corresponding container information. However, an abnormal event may occur before the container file is generated or during the generation of the container file. Such abnormal events can include, for example, software or hardware failure including recording application crash, battery failure, accidental disconnection or malfunction of storage medium, recording device, or any other critical components for recording, and the like. In some cases, the abnormal events may be caused external forces. For example, if the recording device is carried by a movable object such as an unmanned aerial vehicle (UAV), impact or damage to the movable object may also cause malfunction or damage to the recording device. Such damage to the movable object may be due to weather conditions, fire, explosion, crash, turbulence, takeoff or landing, impact from another object, or other factors. As a result of the abnormal events, the container file may not be generated at all, or there may be a partially and/or improperly generated container file.

When the system resumes operation after an abnormal event, the repair module can be configured to detect the need to properly generate a container file and attempt to locate the content data and the corresponding container information required to generate the container file. To this end, the repair module may be configured to retrieve data from the internal storage device 206 and/or the external storage device 208.

The hollow arrows in FIG. 2 illustrate the communication or data transfer between the repair module 207 and the data storage devices. In some embodiments, the repair module 207 may first check the internal storage 206 for the existence and validity of container information stored therein. Container information is valid if it is up-to-date and can be used to generate a container file. If the container information exists and is valid, then the external storage 208 is checked to determine if the corresponding content data exists. If so, the container data stored on the internal storage 206 and the content data stored on the external storage 208 are used to generate the container file. If the container information is invalid, then the external storage 208 may check for existence of backup container information. If the backup copies correspond to the content data stored on the external storage 208, then a suitable backup copy of the container information is selected from the existing backup copies to combine with the content data in order to generate the container file. In some cases, the selected backup copy is the backup copy that is most recently updated, the one with the largest size, or otherwise suitable based on some other criteria. In various embodiments, the selected container information may be used to repair an existing container file (e.g., by adding or modifying portions of the container file), or to generate a new container file. Detailed discussion of exemplary implementation of the repair process is provided in connection with FIGS. 8-9.

In some cases, the repair module can be configured to generate container files under normal as well as abnormal circumstances. For example, the repair module may be configured to generate container files upon normal completion of recording (e.g., when a user selects a "stop" button on a recording device). In other cases, the repair module may be configured to generate container files only after abnormal circumstances as discussed above.

In various embodiments, the system 200 may include more or less components than illustrated herein. For example, in an embodiment, the system 200 may include a transmission or streaming module for transmitting or streaming the content data, container information, container files, and/or any other types of data to an external entity (e.g., a remote terminal). In another embodiment, the system 200 may include a playback module for playing back the recorded content data. In some other embodiments, the system 200 may not include the storage module or the repair module.

In various embodiments, components of the system 200 can be implemented by one or more devices. For example, in an embodiment, the acquisition module, storage module, internal storage medium and repair module can all be part of a single recording device. In other embodiments, at least some of the above components (e.g., repair module, storage module, acquisition module) or some of the functionalities thereof may be implemented by a device or system that is separate from the recording device. For example, the repair module or the storage module may be implemented by a separate system.

Figure 3:
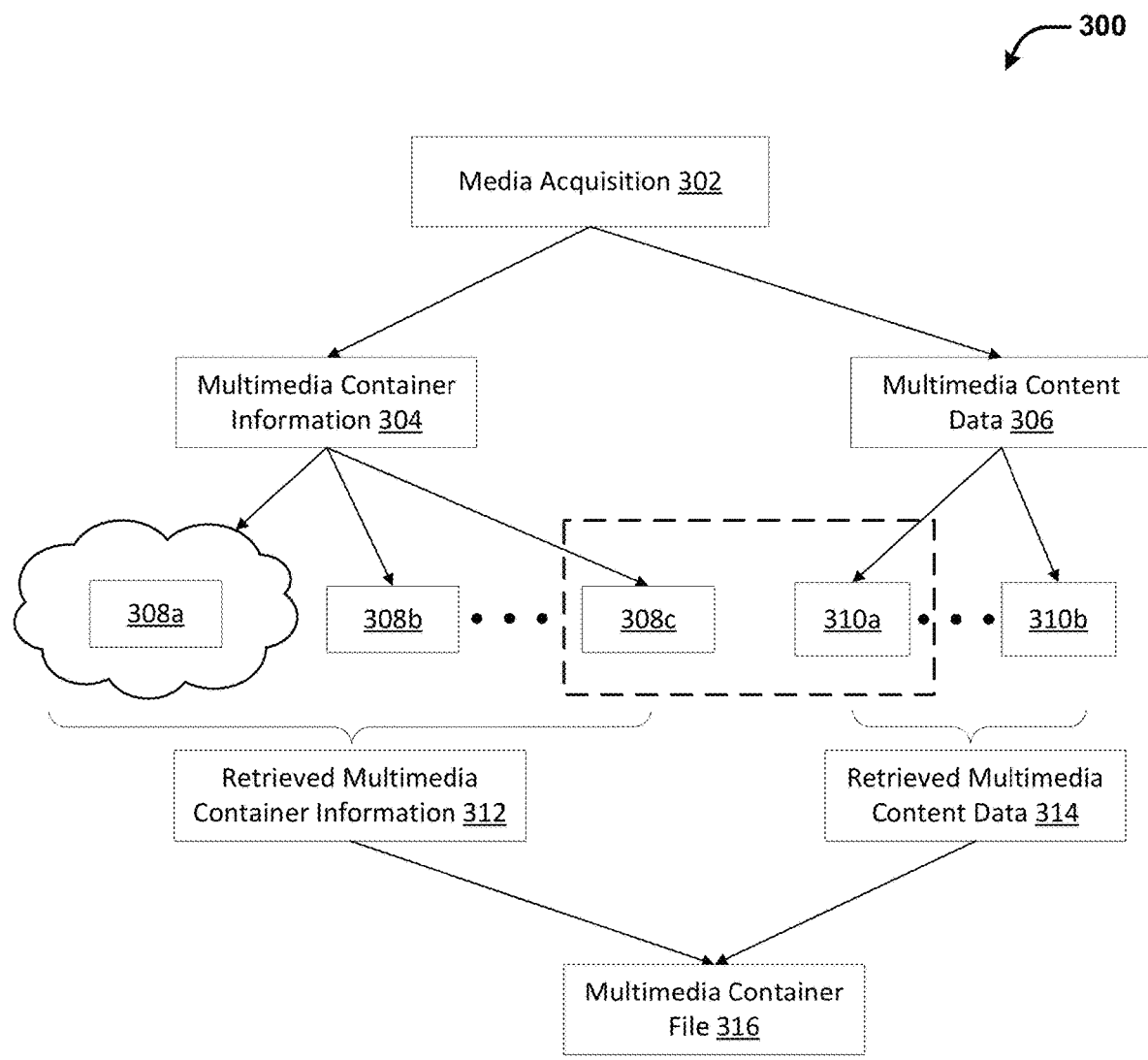
FIG. 3 illustrates an exemplary process for storing and generating multimedia container files, in accordance with an embodiment.

FIG. 3 illustrates an exemplary process 300 for storing and generating multimedia container files, in accordance with an embodiment. After media data is acquired 302, such as by a recording device shown in FIGS. 1-2, the content data 306 is stored in one or more content storage media 310a-b whereas the container information 304 associated with the content data 306 useful for generating the corresponding container file may be stored in one or more container information storage media 308a-c. The number of components such as storage media as shown in FIG. 3 is for illustrative purposes only and not intended to be limiting. The storage media may include various storage devices with varying characteristics. For example, the storage media may be external or internal or removable or non-removable relative to a particular device or system (e.g. a recording device). The storage media may be implemented based on semiconductor (e.g., flash-based memory), magnetic (e.g., hard drive disks), optical (e.g., optical disks), or any suitable technologies. Furthermore, the storage media may include local and remote storage devices (e.g., remote data storage servers).

The container information storage media may overlap with the content storage media, as shown by the dotted box surrounding container information storage medium 308c and content storage medium 310a. That is, at least some of the container information storage media (e.g., storage medium 308c) may be the same as at least some of the content storage media (e.g., storage medium 310). In some cases, the content storage media is a subset of the container storage media. In other cases, the content storage media includes at least one storage medium that is not part of the container storage media.

In some embodiments, the container storage media includes at least one storage medium that is not part of the content storage media (e.g., storage media 308a-b). Furthermore, the container storage media may include local storage media (e.g., storage media 308b-c) and/or remote storage media (e.g., storage medium 308a).

The container information stored on the container storage media 308a-c may be updated at substantially the same or different frequencies. For example, a primary copy of the container information stored on an internal storage of a recording device may be updated in real-time or nearly real-time as the container information is generated and/or as the content data is generated; whereas a backup copy of the container information may be updated at a lower frequency. As another example, a copy of the container information stored on a local storage medium may be updated at a higher frequency than a copy of the container information stored at a remote storage.

In some cases, the container information and/or the content data may be divided into smaller portions and/or encoded before being stored on one or more storage media. For example, the container information and/or the content data may be encoded with redundancy or forward error correction coding scheme and the encoded data may then be stored in the various storage media. In some other cases, the container information and/or the content data may be compressed, encrypted or otherwise processed before being stored. In yet some other cases, the container information and/or the content data may be stored as a whole and/or unprocessed on the storage media. In some embodiments, the storage and/or update of the container information and/or content data as discussed may be performed by the recording device (e.g., by the storage module as discussed in FIG. 2), or by some other computing devices.

During the generation of container file, either under normal circumstances or after abnormal events, the content data 314 and the corresponding container information 312 are retrieved from the respective storage, according to the methods discussed herein. In some embodiments, the retrieved data may be further processed (e.g., decoded, decompressed, or decrypted) before being used to generate the container file 316.

Figure 4:
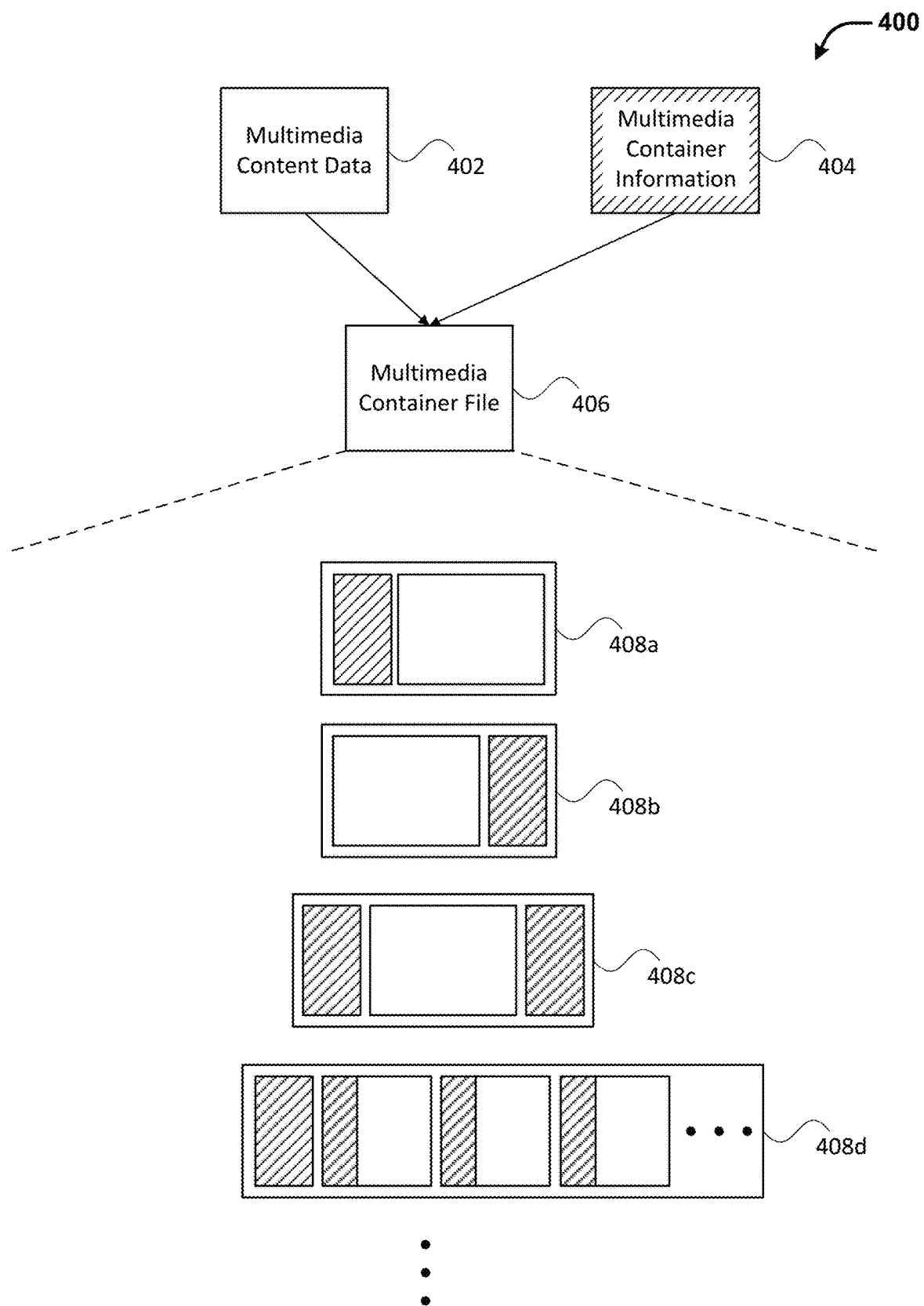
FIG. 4 illustrates some exemplary ways multimedia container information and multimedia content data can be combined to generate a multimedia container file.

In various embodiments, multimedia content data and the corresponding multimedia container information can be combined in different ways to generate a multimedia container file according to the specification of the multimedia container format for the multimedia container file. FIG. 4 illustrates some exemplary ways multimedia container information and multimedia content data may be combined to generate a multimedia container file. As illustrated, multimedia content data 402 and the corresponding multimedia container information 404 can be combined to generate a multimedia container file 406. Based on different container formats 408a-d, the content data (illustrated in white) and the container information (illustrated in a stripe pattern) can be structured differently inside the container file. For example, the container information can be stored in the header of the container file, followed by the content data, such as according to the container format 408a. The container information can also be stored at the end of the content data, such as according to the container format 408b. The container information can also be stored at both the beginning and the end of the file, such as according to the container format 408c. The content data and/or container information can also be divided and interleaved in the container file such as according to the container format 408d.

FIG. 5 illustrates an exemplary process 500 for implementing multimedia management, in accordance with an embodiment. Aspects of the process 500 may be performed by the components of the multimedia management system discussed in connection with FIGS. 1-2. Some or all aspects of the process 500 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 500 includes storing 502 multimedia content data on a first storage medium. The multimedia content data may include audio, visual or other types of data. The content data may be obtained from a recording device such as discussed in FIGS. 1-2. Examples of recording devices include cameras (e.g., digital cameras), camcorders, video cameras, digital media players (PMPs), camera phones, smart phones, personal digital assistants (PDAs), tablet computing devices, laptop computers, desktop computers, smart TVs, game consoles, and the like. The first storage medium can be similar to the external storage 108a-b and 208 discussed in FIGS. 1-2 or content storage 310a-b discussed in FIG. 3. For example, the first storage medium may include a memory card (e.g., SD card or USB drive) that can be removably or detachably coupled to the recording device. In some cases, the first storage medium also include a remote storage device that can be operatively connected to the recording device, for example, via a network connection.

As discussed above, the content data may be compressed, encrypted, encoded, or otherwise processed before being stored in a storage medium. In some embodiments, the content data that updated in real-time or nearly real-time as new content data is captured by the recording device. The other embodiments, the content data may be updated incrementally on a periodic basis (e.g., every few seconds).

The process 500 includes storing 504 a primary copy of the multimedia container information associated with the multimedia content data on a second storage medium. The multimedia container information is useful for generating a multimedia container file according to a multimedia container format. The multimedia container file contains the multimedia content data and information based on the multimedia container information that is useful for playing back or otherwise rendering the multimedia content data.

Container information generally refers to any information associated with the corresponding content data that is used to generate a container file according to a particular container format. The container information may include metadata describing the container file, content data, other metadata, or any suitable information such as user-defined extension data. Examples of such container data can include size, length, height, width, frame rate, file location information (e.g., start position, end position, and/or offset), encoding information (e.g., codec information or error correction code information), encryption information, and other information of the content data or components thereof. Components of the content data can include tracks, frames, chapters, and the like. Metadata stored in the container file can be related to the content data as a whole or individual components thereof. In various embodiments, the container information may be used to directly or indirectly populate the container file. For example, some container information may be directly copied into the corresponding container file, while other container information may be used to generate further information that is then copied into the container file.

The second storage medium can be similar to the internal storage 106 and 206 discussed in FIGS. 1-2 or container information storage 308a-c discussed in FIG. 3. For example, the second storage can include one or more data storage devices that are typically an integral part of and not detached the recording device. Examples of such internal storage media include internal flash memory of the recording device such as NAND-type flash memory and other suitable types of memory devices. In some cases, the internal storage media can be accessed, via an internal bus, by a processing unit of the recording device.

The container information may be encoded, encrypted, or otherwise processed before being stored in a storage medium. In some embodiments, the container information may be updated in real-time or nearly real-time as new container information is generated, as new content data is captured by the recording device and/or as the content data is updated. The other embodiments, the container information is updated independently of the recording of the content data (e.g., on a periodic basis).

As discussed above, the present invention provides methods for redundantly storing container information, which is essential for the repair and generation of container files. Process 500 includes storing 506 one or more backup copies of multimedia container information on the first storage medium. The backup copies of container information may be similar to the back copies of the container information 114a-c or 214a-b discussed in FIGS. 1-2. The backup copies may be initially stored and subsequently updated substantially concurrently as the recording of the content data and/or the primary copy of the container information. Typically, the backup copies of the container information are updated at a lower frequency than the update of the primary copy of the container information. In some embodiments, the backup copies of the container information may be updated at the same frequency as the primary copy of the container information. In some embodiments, the backup copies of the container information may be updated on a periodic basis (e.g., every few seconds) according to a predetermined schedule. For example, the backup copies may be updated in an alternating fashion (e.g., copy 1 is updated, followed by copy 2, followed by copy 1, etc.). As another example, the backup copies may be updated based on predetermined priorities or other factors such as location, load, importance, and other characteristics associated with the copies and/or the storage medium or media.

Finally, process 500 includes generating 508 the multimedia container file based at least in part on the multimedia content data and a preferred copy of multimedia container information selected from a group comprising the primary copy of multimedia container information and the one or more backup copies of multimedia container information. More details on the generation of the container file is provided in the discussion of FIGS. 7-8. After the container file is successfully generated, the primary copy of the container information, backup copy of the container information, and/or the content data may be optionally deleted, marked for deletion, obscured, or otherwise rendered unreadable to free up storage space.

FIG. 6 illustrates an exemplary process 600 for implementing multimedia recording, in accordance with an embodiment. Aspects of the process 600 may be performed by the components of the multimedia management system discussed in connection with FIGS. 1-2. For example, the process 600 may be implemented by the recording system 104 of FIG. 1 or the storage module 205 of FIG. 2. In general, the process 600 can be used to provide redundancy to the storage of container information, thereby increasing the robustness of the multimedia recording systems.

The process 600 includes recording 602 content data on a first storage medium. The recording can occur in real-time or nearly real-time as the capture or generation of the content data such as such as audio, video, still images, or other type of data. In some embodiments, the captured media data may be compressed, encrypted, encoded (e.g., with forward correction code), or otherwise processed before it is recorded. The content data may be stored as one or more objects (e.g., files) that may be stored sequentially in a contiguous region of the storage medium or at different partitions or portions of the storage medium. In some embodiments, the first storage medium may be similar to the first storage medium discussed in FIG. 5. For example, the first storage medium may include a removable memory card such as an SD card or a USB drive that can be detachably coupled to a recording device.

The process 600 also includes recording 604 container information associated with the content data on a second storage medium. The recording can occur in real-time or nearly real-time as the generation of the container information and/or generation of the content data such. In some other embodiments, there may be substantial delays between the capture and/or recording of the content data and the recording of the container information. As discussed above, the container information is related to the content data and may be generated based on the content data or provided by an external entity such as a user or a remove control device. In some embodiments, the container information may be processed (e.g., encrypted) before storage. The container information may be stored as one or more objects (e.g., files) that may be stored sequentially in a contiguous region of the storage medium or at different partitions or portions of the storage medium. In some embodiments, the second storage medium may be similar to the second storage medium discussed in FIG. 5. For example, the second storage medium may include an internal flash memory of a recording device.

The process 600 also includes updating 606 one or more backup copies of the multimedia container information that is stored in the first storage medium. The backup copies of the multimedia container information may be stored on the same storage medium as the content data (e.g., the first storage medium) or on a third storage medium that is different from the first and second storage media. Advantageously, storing container information on different storage media provides redundancy to the container information thereby increasing the robustness of the multimedia file repair process. For example, if the primary copy of the container information stored on the second storage becomes unavailable (e.g., due to erasure, corruption, or a failure of the storage device), a backup copy of the container information may still be available for use.

The backup copies may be stored and updated substantially concurrently with the recording of the content data and/or the recording of the container information. Each backup copy may be updated at a predetermined or arbitrary frequency. The frequency for updating the backup copies is typically less than the update frequency for the content data or for the primary container information, although in some cases, the backup frequency may be substantially the same as that for the content data and/or for the primary container information. In general, when the content data, primary copy of the container information, or backup copies of the container information is updated, an update indicator associated with the updated data may also be refreshed, for example, to indicate the last update time, the number of updates, or the like. The update indicator may be used in a subsequent repair process to select the suitable copy to use for the generation of a container file.

Figure 7:
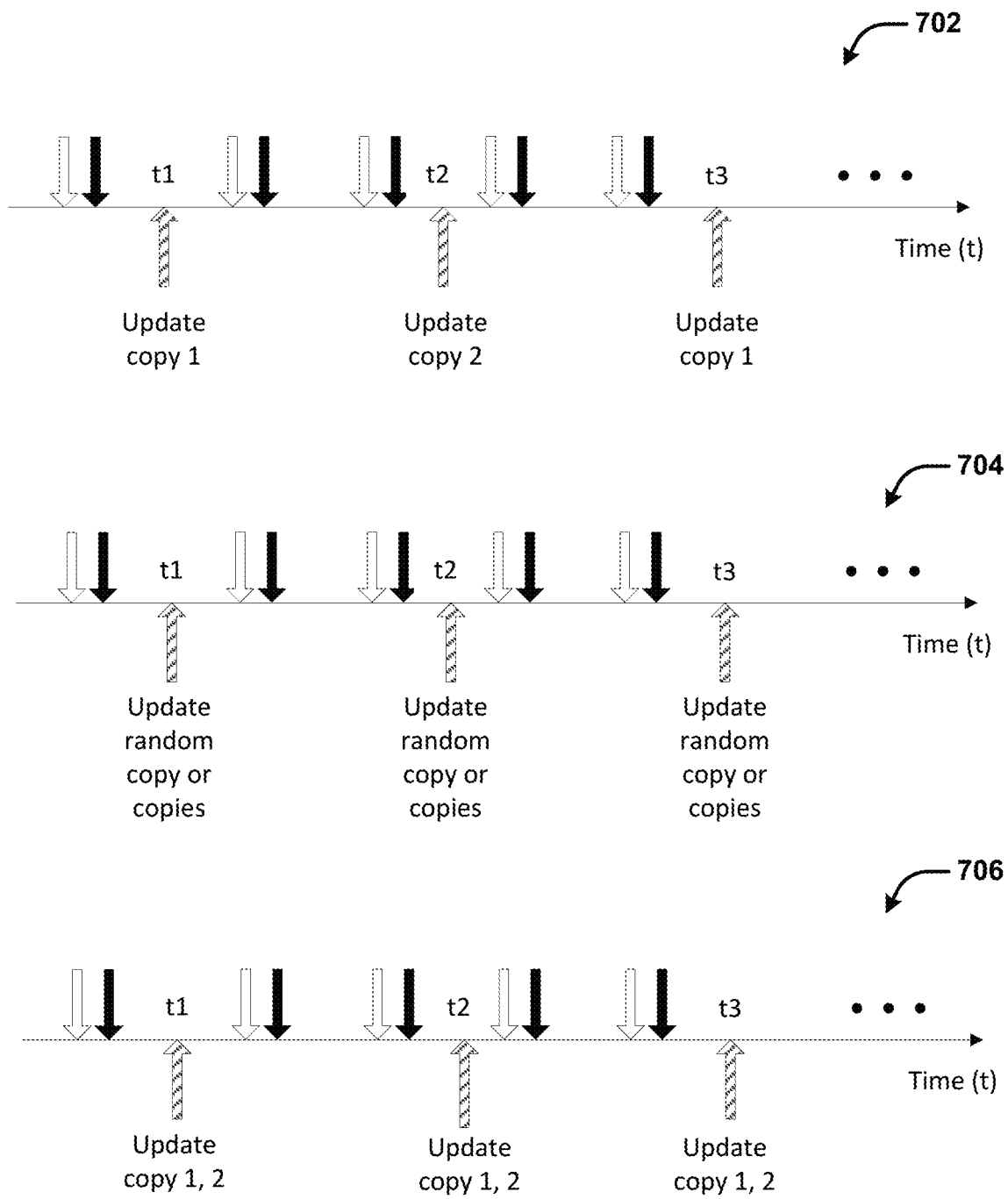
FIG. 7 illustrates some exemplary timelines for data updates, in accordance with an embodiment.

FIG. 7 illustrates some exemplary timelines for data updates, in accordance with an embodiment. The hollow arrows indicate updates for the content data, the solid black arrow indicates updates for the primary copy of container information, and the striped arrows indicate updates for the backup copies of the container information. While two backup copies are shown here for illustrative purposes only, the same update pattern can apply to arbitrary number of copies.

In some embodiments, such as illustrated by the timeline 702, the backup copies are updated in an alternating or round-robin fashion. For example, backup copy 1 is update at t1, backup copy 2 is updated at t2, and backup copy 1 is updated at t3, and so on.

In some other embodiments, such as illustrated by the timeline 704, the backup copies are updated in a random fashion. That is, a random backup copy or copies of container information may be selected for update at certain intervals of time.

In yet some other embodiments, such as illustrated by the timeline 706, a cluster of backup copies can be updated around the same time at certain intervals of time. For example, backup copy 1 and backup copy 2 are updated at the around t1, t2, t3, and so on.

As illustrated in the above examples, the update of the backup copies occur substantially concurrently with the update of the content data and/or primary copy of the container information, although typically at a lower frequency so as to reduce overhead associated with the updates. In other embodiments, update patterns other than those discussed herein may be used to update the backup copies.

Figure 8:
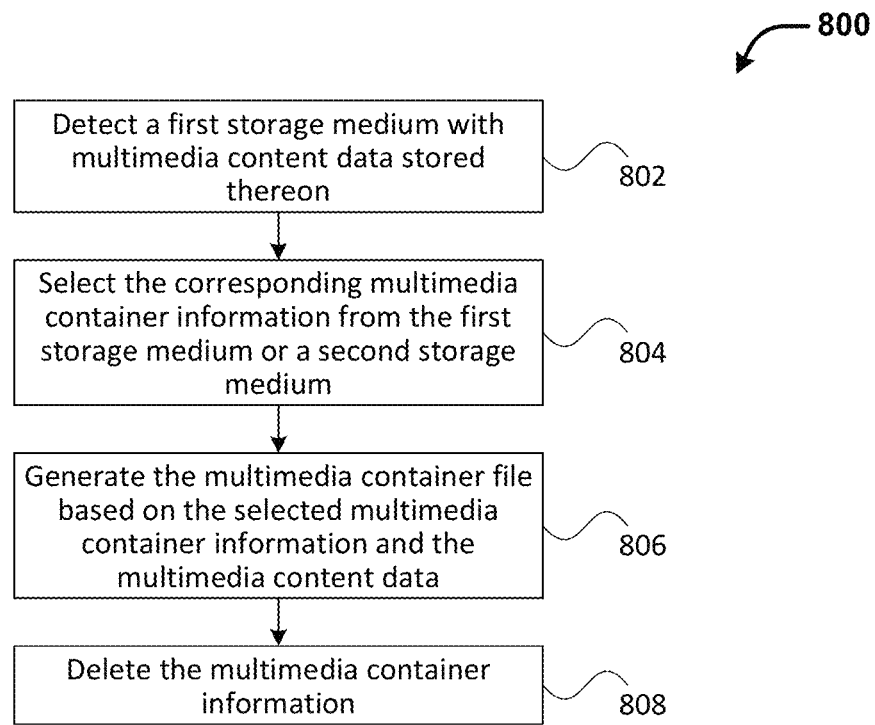
FIG. 8 illustrates an exemplary process for implementing multimedia file repair, in accordance with an embodiment.

FIG. 8 illustrates an exemplary process 800 for implementing multimedia file repair, in accordance with an embodiment. Aspects of the process 800 may be performed by the components of the multimedia management system discussed in connection with FIGS. 1-2. For example, the process 800 may be implemented by the recording system 104 of FIG. 1 or the repair module 207 of FIG. 2.

The process 800 includes detecting 802 a first storage medium with multimedia content data stored thereon. The first storage medium may be similar to the first storage medium discussed in FIGS. 5 and 6. For example, the first storage medium may include a removable memory card such as an SD card or a USB drive that can be detachably coupled to a recording device.

In general, the process 800 may include the detection of a predetermined event or condition that signals the resumption of normal operation after an abnormal event, or the need to start the container file repair process. Such predetermined events or conditions may include the power on of a device, the connection of a removable storage medium, the detection of a partially generated container file, the detection of an error caused by the abnormal event, and the like.

The process 800 includes selecting 804 the corresponding multimedia container information that matches the content data stored on the first storage medium so as to generate the corresponding container file. In some embodiments, the container information may be selected from the first storage medium or a second storage medium. The second storage medium may be similar to the second storage medium discussed in FIGS. 5 and 6. For example, the second storage can include one or more data storage devices that are typically an integral part of and not normally detached from the recording device. Examples of such internal storage media include internal flash memory of the recording device such as NAND-type flash memory and other suitable types of memory devices. In some cases, the internal storage media can be accessed, via an internal bus, by a processing unit of the recording device. In some embodiments where the backup storage information is stored in additional (e.g., third, or fourth) storage media, such additional storage media may be searched to find the most suitable container information to be used for the generation of the container file.

In some embodiments, the storage media containing the container information (e.g., primary or backup copies) may be searched according to a predetermined or random order. The order may be based on the reliability, update status, location, size, cost, and other factors. For example, storage medium that is most likely to have the most up-to-date container information (e.g., the second or internal storage medium) may be searched first; whereas the storage medium or media less likely to have the most up-to-date container information (e.g., the first or external storage medium) may be searched next. As another example, the storage medium or media with faster access time may be searched before the storage medium or media with slower access time.

Similarly, when multiple copies of container information are stored on a given storage medium, the selection of the preferred copy to be used for the generation of the container file may be based on a random or predetermined order (e.g., based on reliability, update status, size, location, cost, and other factors). For example, in an embodiment, the backup copy that is the last successfully updated or has the highest number of successful updates is selected from a plurality of backup copies of container information. As another example, the backup copy with the largest file size is selected. Once the corresponding container information is identified and retrieved, the multimedia container file can be generated 806 by combining it with the content data, such as discussed in connection with FIG. 4.

In some embodiments, the container information including the primary copy and/or the backup copies is preferably deleted, marked for deletion or otherwise rendered obsolete 808 after the successful generation of the container file. In other embodiments, the container information may be kept for a predetermined or arbitrary period of time. In some cases, the content data may also be deleted, marked for deletion, or otherwise rendered obsolete after the successful generation of the container file or kept for a predetermined or an arbitrary period of time.

Figure 9:
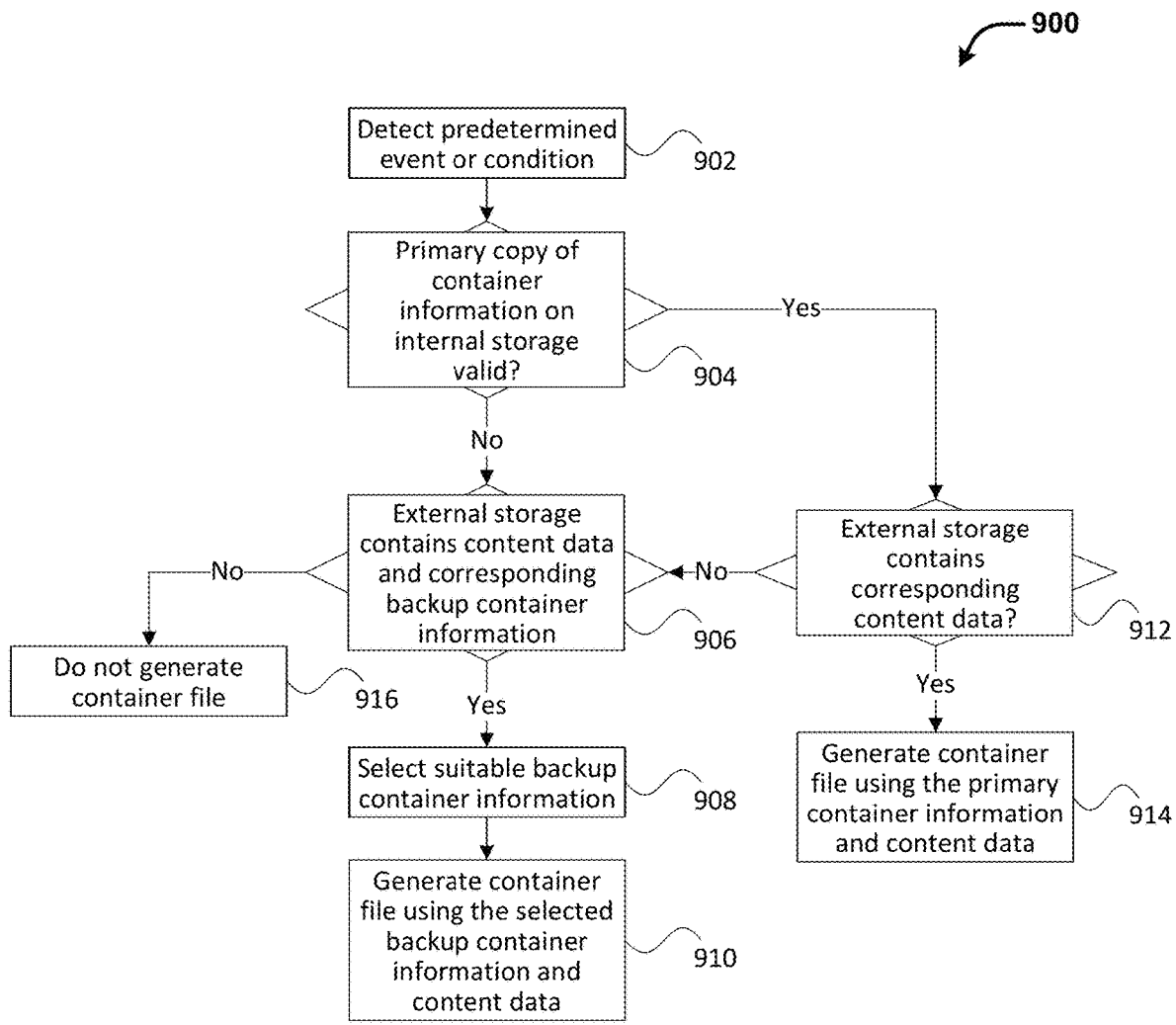
FIG. 9 illustrates an exemplary process for implementing multimedia file repair, in accordance with an embodiment.

FIG. 9 illustrates an exemplary process 900 for implementing multimedia file repair, in accordance with an embodiment. In some embodiments, the process 900 may be used to find the matching container information for given content data in order to generate the corresponding container file. Aspects of the process 900 may be performed by the components of the multimedia management system discussed in connection with FIGS. 1-2. For example, the process 800 may be implemented by the recording system 104 of FIG. 1 or the repair module 207 of FIG. 2.

The process 900 includes detecting 902 a predetermined event or condition. Such a predetermined event or condition may include the connection of a removable medium such as a memory card to a recording device. The connection may be detected upon the power up of the recording device or during the operation of the recording device.

The process 900 includes determining 904, in response to the detected event or condition, whether a primary copy of container information is stored on an internal storage of a recording device and is valid. The internal storage may be similar to the internal storage 106 and 205 in FIGS. 1 and 2, respectively.

Generally, a copy of container information (either a primary copy or a backup copy) is valid if it can be used to generate container files. In some cases, the validity of the copy of container information may be represented by a validity indicator or flag associated with the copy of the container information. For example, a "0" may indicate that copy of container information is invalid and a "1" may indicate otherwise. Other variations of the validity indicator (e.g., numeric, alphabetical, or a combination thereof) are also within the scope of the invention.

The validity indicator may be set to indicate that the copy of container information is valid or invalid under certain circumstances. For example, the validity indicator may be set to indicate validity after the associated copy of container information is successfully updated to reflect the most up-to-date container information. The validity indicator may be set to indicate invalidity after the associated copy of container information is used to successfully generate a container file, such as normally occur at the end of a recording if the recording is not disrupted by an abnormal event (e.g., sudden ejection of a storage medium or a hardware or software failure). When a copy of container information is invalid, it can typically be safely deleted from storage. As another example, the validity indicator may be set to indicate invalidity if, for some reason, the associated copy of container information is not updated successfully.

If the primary copy of the container information is determined to be valid, then it is determined 912 whether an external storage contains the corresponding content data. The external storage may be similar to the external storage 108*a-b* and 208 in FIGS. 1 and 2, respectively. As discussed above, the external storage can be used to store content data as well as backup copies of container information to provide redundancy to the primary copy of container information stored on the internal storage.

If the primary copy of the container information on the internal storage is valid, as determined at step 904, and the external storage contains the corresponding content data, as determined at step 912, then the primary copy of the container information and the corresponding content data are used to generate 914 the container information as discussed above. In some embodiments, container information (e.g., primary or backup) includes content identification information that may be used to identify the corresponding content data.

If the primary copy of the container information on the internal storage is valid, as determined at step 904, but the external storage does not contain the corresponding content data, as determined at step 912, then it is determined 906 whether the external storage contains both content data. The external storage may have content data but the content data may not correspond with the primary container information stored on the internal storage. This scenario may occur, for example, if the a different external storage (e.g., a different SD card) is connected to the recording device after an abnormal event. The external storage may include some content data that does not necessarily correspond with the primary container information. The external storage may also contain some backup container information that corresponds with the content data, but not necessarily with the primary container information. In embodiments where backup container information is removed from storage after a successful repair or generation of container file, the existence of such backup container files on the external storage indicates that there is a need to generate a container file based on the backup copies of container information and the content data stored on the external storage, as is performed in step 910, discussed below. On the other hand, if the primary copy of container information on the internal storage is invalid (meaning that the primary copy cannot be used to generate the container file), as determined at step 904, then the process 900 also proceeds to step 906.

In some embodiments, step 906 involves determining firstly the existence of backup container information. As discussed above, in cases where backup container information is removed after a successful generation of container file, the existence of such backup container information typically indicates that the backup container information has not been used to generate container files. If such backup container information exists, then the external storage is checked for the existence of the corresponding content data.

If the external storage contains both content data and the corresponding backup container information, as determined at step 906, then the suitable backup copy of container information is selected 908 according to predetermined rules. For example, if there are multiple backup copies of the container information that correspond to the content data stored on the external storage, then in an embodiment, the backup copy that is the last to be updated successfully is selected. Such a selection may be based on an update indicator that indicates when the last update was performed. Additionally or alternatively, the selection of the suitable or preferred backup copy of container information may be based on user-specified or predetermined rules that are based on other factors. Such factors may include, for example, other attributes or characteristics associated with the copy or storage device of the copy such as validity indicator, file size, creation time, time of last access, validity indicator, and the like. The selected backup copy of container information is used, along with the content data on the external storage, to generate 910 the container file.

Otherwise, if the external storage contains does not contain content data and the corresponding backup container information, as determined at step 906, then no repair operation is performed to generate a container file, as indicated at step 916.

In some embodiments, the process 900 further comprises deleting, mark for deletion or otherwise render obsolete the container information (e.g., primary copy of the container information and/or backup copies of the container information) and/or content data from data storage after the successful generation of container files (e.g., after steps 910 or 914). Such deletion may be performed within a predetermined period of time after the generation of container files or according to a predetermined algorithm or schedule.

Figure 10:
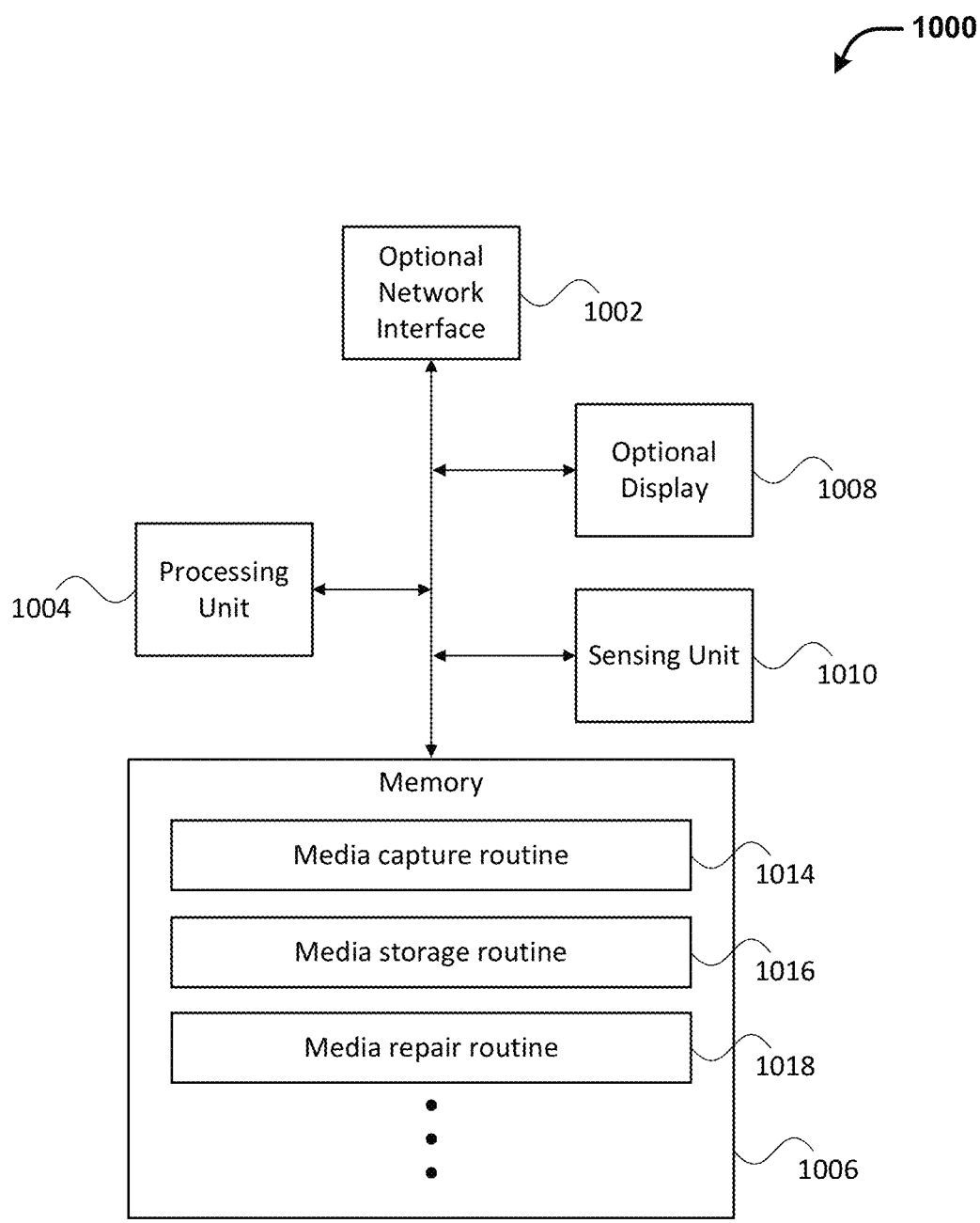
FIG. 10 illustrates an exemplary device for implementing aspects of the present invention, in accordance with an embodiment.

FIG. 10 illustrates an exemplary device 1000 for implementing aspects of the present invention, in accordance with an embodiment. For example, the device 1000 may be configured to implement a recording device such as recording devices 102 and 202 discussed in FIGS. 1 and 2, respectively, or components thereof. In some embodiments, the device 1000 may include many more components than those shown in FIG. 1000. However, it is not necessary that all of these components be shown in order to disclose an illustrative embodiment. The device 1000 includes a processing unit 1004, memory 1006, sensing unit 1010, optional communication interface 1002, and optional display 1008. The components of the device 1000 may be operatively connected to each other via a bus or other types of communication channels.

The sensing unit 1010 can utilize different types of sensors that collect information relating to the surroundings of the device. Different types of sensors may sense different types of signals or signals from different sources. For example, the sensors can include vision/image sensors to collect visual signals and microphones to collect sound. In some cases, the sensing unit may also include inertial sensors, GPS sensors, proximity sensors (e.g., LIDAR), and the like, to collect other information related to the state of the recording device or an object carrying the recording device such as an unmanned aerial vehicle (UAV).

The processing unit 1004 can have one or more processors, such as a programmable processor (e.g., a central processing unit (CPU)). The processing unit 1004 can be operatively coupled to a memory 1006. The memory 1006 can include transitory and/or non-transitory storage media configured to store data, and/or logic, code, and/or program instructions executable by the processing unit 1004 for performing one or more routines or functions. The memory can include one or more memory units (e.g., flash memory card, random access memory (RAM), read-only memory (ROM), and the like). In some embodiments, data from the sensing unit 1010 can be conveyed to and stored within the memory units of the memory 1006.

The memory units of the memory 1006 can store routines, logic, and/or code comprising program instructions executable by the processing unit 1004 to perform any suitable embodiment of the methods described herein. For example, the memory 1006 can comprise a media capture routine 1014 for capturing sensing data and/or processing the captured sensing data, a media storage routine 1016 for storing sensing data and/or data related to the sensing data (e.g., container information), a media repair routine 1018 for repairing and/or generating container files, and other routines such as playback or streaming of media files. Although FIG. 1000 depicts a single processing unit 1004 and a single memory 1006, one of skill in the art would appreciate that this is not intended to be limiting, and that the device 1000 can include a plurality of processing units and/or memory units of the memory.

As shown in FIG. 1000, the device 1000 can include an optional communication interface 1002 configured to allow communication with external devices. For example, the communication interface 1002 may include transmitters, receivers, and/or transceivers for transmitting data to and/or receiving data from the external devices. The communication interface 1002 can also include one or more network interfaces (e.g., network cards) for communications over one or more networks such as the Internet, wireless networks, cellular networks, and any other network. In some embodiments, the device 100 may not include any communication interface 1002.

The optional display 1008 may be configured to provide a graphical user interface to a user operating the device 1000 for receiving user input, displaying output (e.g., audio or video), and/or executing applications. In some embodiments, the device 100 may not include any display 1008.

According to aspects of the present invention, the multimedia management systems and apparatus described herein can be operatively coupled and/or carried as a payload by a wide variety of movable objects. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. The movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user. For example, the movable object may be controlled with the aid of a controlling terminal and/or monitoring terminal. The user may be remote from the movable object, or on or in the movable object while using the controlling terminal and/or monitoring terminal to control the movable object. The movable object can an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 700 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm, 500 cm$^3$, 750 cm$^3$, 700 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 700 kg. The weight of the movable object may be less than or equal to about: 700 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 700 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 11:
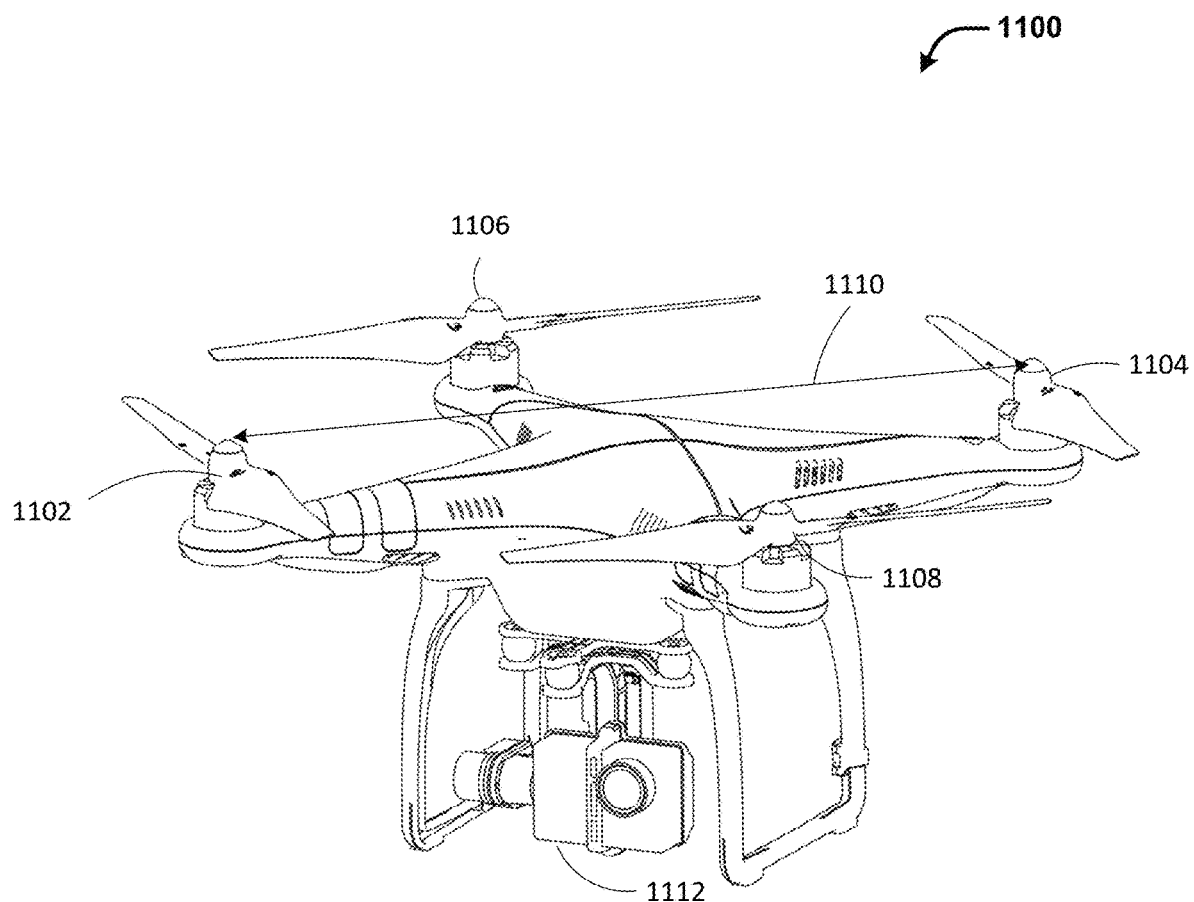
FIG. 11 illustrates an unmanned aerial vehicle (UAV) carrying a multimedia management system such as described herein, in accordance with some embodiments.

FIG. 11 illustrates an unmanned aerial vehicle (UAV) 1100 carrying a multimedia management system such as described herein, in accordance with some embodiments. The UAV may be an example of a movable object as described herein. The UAV 1100 can include a propulsion system having four rotors 1102, 1104, 1106, and 1108. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1110. For example, the length 1110 can be less than or equal to 2 m, or less than equal to 5 m. In some embodiments, the length 1110 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load 1112. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. In some embodiments, the payload may be configured to implement methods for multimedia recording and repair as disclosed herein. For example, a movable object can be an UAV and the payload can include a recording device such as discussed in FIGS. 1-2. The recording device may be configured to capture videos, sound, and other data of the surroundings of the UAV. The captured data such as video may be streamed back down to a control terminal or base station. The methods for repairing multimedia files, as disclosed herein, may be especially important for UAVs or other moving vehicles. UAVs are typically exposed to elements of nature and/or attacks of hostile forces, causing malfunction and/or to damage to the UAV and payload carried by the UAV, for example, due weather conditions, impact from landing/takeoff or surrounding obstacles, and the like. For example, a turbulence, impact or even crash of the UAV may cause a disconnect or damage to a component critical to recording operation of the recording device, thereby disrupting the recording. As such, a recording device carried by such a UAV should be prepared to recover gracefully from potentially frequent disruption of recordings caused by such abnormal events so as to protect the recorded media content data.

and robust enough to recover or repair data from unexpected disruptions of operation where Due to the operating environment of UAVs, the recording devices carried by the UAV m The payload can be configured not to perform any operation or function. Alternatively, the payload can be a payload configured to perform an operation or function, also known as a functional payload. For example, the payload may be an image capturing device. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload.

Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. For example, the communication may be with a monitoring terminal described herein. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for managing multimedia information, comprising:

storing multimedia content data and at least one backup copy of multimedia container information on an external storage medium, wherein the multimedia content data is collected by a payload onboard a movable object, and wherein the external storage medium is detachably coupled with the payload;

storing a primary copy of the multimedia container information on an internal storage medium coupled with the payload, wherein the multimedia container information includes physical state information for determining a state associated with the movable object, the physical state information corresponding to the multimedia content data;

updating the multimedia content data and the primary copy of the multimedia container information according to a first frequency, and updating the at least one backup copy of the multimedia container information according to a second frequency, the first frequency being greater than the second frequency, wherein the primary copy or the at least one backup copy of multimedia container information is copied to a multimedia container file according to a multimedia container format and combined with the multimedia content data to generate the multimedia container file containing the multimedia content data; and performing a repair or regeneration of the multimedia container file upon occurrence of an abnormal event affecting operation of the payload or the movable object, wherein the repair or regeneration of the multimedia container file comprises:

determining whether the primary copy of multimedia container information is valid and unaffected by the abnormal event;

selecting the primary copy of multimedia container information as a preferred copy if the primary copy of multimedia container information is determined to be valid, or selecting the at least one backup copy of multimedia container information as the preferred copy if the primary copy of multimedia container information is determined to be invalid; and repairing or regenerating the multimedia container file using the multimedia content data and the preferred copy of multimedia container information.

2. The method of claim 1, wherein the movable object includes an unmanned aerial vehicle (UAV).

3. The method of claim 1, wherein the payload includes a recording device configured to collect audio or video data of surroundings of the movable object, wherein the multimedia content data comprises the collected audio or video data.

4. The method of claim 1, wherein the abnormal event is caused in part by (1) impact resulting from landing or takeoff of the movable object, (2) impact of the movable object or the payload with obstacles, or (3) weather conditions affecting the operation of the movable object or the payload.

5. The method of claim 1, wherein the multimedia container file contains the physical state information of the payload collected with aid of one or more sensors, wherein the one or more sensors are located onboard the payload or the movable object.

6. The method of claim 1, wherein the primary copy of multimedia container information is suitable for generating the multimedia container file if the primary copy of multimedia container information is determined to be valid, and unsuitable for generating the multimedia container file if the primary copy of multimedia container information is determined to be invalid.

7. The method of claim 1, wherein the primary copy of multimedia container information is determined to be valid when the primary copy is successfully updated to reflect most up-to-date multimedia container information.

8. The method of claim 5, wherein the physical state information of the payload comprises positional information, attitude, or movement information of the payload, and wherein the positional information is provided as part of a caption for the multimedia container file.

9. The method of claim 1, wherein the repairing or regenerating of the multimedia container file is performed onboard and during the operation of the movable object.

10. The method of claim 1, further comprising: streaming the repaired or regenerated multimedia container file from the movable object to a control terminal, wherein the control terminal is configured to remotely control the operation of the movable object or the payload.

11. The method of claim 1, wherein the repair or regeneration of the multimedia container file is performed automatically in response to at least one detected condition indicating that the payload has resumed normal operation after the occurrence of the abnormal event.

12. The method of claim 11, wherein the at least one detected condition comprises: powering on of the payload, connection of another storage medium to the payload, detection of a partially generated multimedia container file, or detection of an error in the multimedia container file caused by the abnormal event.

13. The method of claim 11, wherein the repair or regeneration of the multimedia container file is performed automatically in response to a user input provided via a control terminal.

14. The method of claim 1, further comprising: removing the at least one backup copy of multimedia container information from the external storage medium after the multimedia container file is successfully repaired or regenerated.

15. The method of claim 1, wherein the primary copy of multimedia container information is selected as the preferred copy, if the primary copy of multimedia container information is determined to be valid, and if the multimedia content data stored on the external storage medium is associated with the primary copy of multimedia container information.

16. The method of claim 1, wherein the at least one backup copy of multimedia container information is selected as the preferred copy if the multimedia content data stored on the external storage medium is associated with the at least one backup copy of multimedia container information.

17. The method of claim 16, wherein the primary copy of multimedia container information is not selected as the preferred copy if the multimedia content data stored on the external storage medium is not associated with the primary copy of multimedia container information.

18. The method of claim 1, wherein the payload is movably coupled with the movable object via a carrier.

19. An apparatus for managing multimedia information, comprising:

one or more processors; and memory, including instructions executable by the one or more processors to cause the system to perform the method of claim 1.

20. A system for managing multimedia information, said system comprising:

a movable object;

a payload onboard the movable object, wherein the payload is configured to collect multimedia content data;

a memory unit comprising (1) an external storage medium that is detachably coupled with the recording device and (2) an internal storage medium that is coupled with the recording device; and one or more processors configured to:

store the multimedia content data and at least one backup copy of multimedia container information on the external storage medium;

store a primary copy of the multimedia container information on the internal storage medium, wherein the multimedia container information includes physical state information for determining a state associated with the movable object, the physical state information corresponding to the multimedia content data;

update the multimedia content data and the primary copy of the multimedia container information according to a first frequency, and update the at least one backup copy of the multimedia container information according to a second frequency, the first frequency being greater than the second frequency, wherein the primary copy or the at least one backup copy of multimedia container information is copied to a multimedia container file according to a multimedia container format and combined with the multimedia content data to generate the multimedia container file containing the multimedia content data; and perform a repair or regeneration of the multimedia container file upon occurrence of an abnormal event affecting operation of the payload or the movable object, wherein the repair of regeneration of the multimedia container file comprises:

determining whether the primary copy of multimedia container information is still valid;

selecting the primary copy of multimedia container information as a preferred copy if the primary copy of multimedia container information is determined to be valid, or selecting the at least one backup copy of multimedia container information as the preferred copy if the primary copy of multimedia container information is determined to be invalid; and repairing or regenerating the multimedia container file using the multimedia content data and the preferred copy of multimedia container information.

* * * * *